United States Patent
Swoboda et al.

(10) Patent No.: US 7,561,596 B2
(45) Date of Patent: Jul. 14, 2009

(54) SYSTEMS AND METHODS FOR MULTIPLEXING AND DEMULTIPLEXING MULTIPLE DATA SOURCES

(75) Inventors: Gary L. Swoboda, Sugar Land, TX (US); Bryan J. Thome, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 630 days.

(21) Appl. No.: 11/381,688

(22) Filed: May 4, 2006

(65) Prior Publication Data

US 2006/0262787 A1    Nov. 23, 2006

Related U.S. Application Data

(60) Provisional application No. 60/677,469, filed on May 4, 2005.

(51) Int. Cl.
*H04J 3/00* (2006.01)
(52) U.S. Cl. ...................................... 370/476
(58) Field of Classification Search .................. 370/470, 370/471, 476
See application file for complete search history.

(56) References Cited

U.S. PATENT DOCUMENTS

| | | | | |
|---|---|---|---|---|
| 6,118,797 | A  * | 9/2000 | O'Shea | 370/524 |
| 6,826,179 | B1 * | 11/2004 | Talbot et al. | 370/389 |
| 2005/0174941 | A1 * | 8/2005 | Shanley et al. | 370/235 |

\* cited by examiner

*Primary Examiner*—Derrick W Ferris
*Assistant Examiner*—Angel Brockman
(74) *Attorney, Agent, or Firm*—Mirna G. Abyad; Wade J. Brady, III; Frederick J. Telecky, Jr.

(57) ABSTRACT

The present disclosure describes systems and methods for multiplexing multiple data sources Some illustrative embodiments include a method for combining multiple data sources, including building one or more single-source data words by iteratively selecting a data source, writing data from the data source to each data section within a single-source data word if enough data is available to fill the single-source data word, copying a data bit of the single-source data word to a data bit within a start word, and clearing the data bit of the single-source data word; and including transmitting the one or more single-source data words after transmitting both a start word and one or more multi-source data words within the same data frame The data written into the one or more single-source data words and the data most recently written into the one or more multi-source data words originate from the same data source.

28 Claims, 6 Drawing Sheets

SYSTEMS AND METHODS FOR MULTIPLEXING AND DEMULTIPLEXING MULTIPLE DATA SOURCES

CROSS-REFERENCE TO RELATED APPLICATIONS

The present application claims the benefit of provisional application Ser. No. 60/677,469, filed May 4, 2005 and entitled "Efficient Merging Data Generated by Multiple Sources into a Single Data Stream," which is herein incorporated by reference.

BACKGROUND

At least some computer systems combine data from multiple sources into a single data stream in order to communicate over a single communications resource, such as an interface to a local or wide area network. Many such systems utilize techniques such as time-division multiplexing and framed data blocks to identify the source of the data as the data is merged into a single stream. But time division multiplexing results in unused bandwidth if a data source is inactive. Framed data blocks avoid the issue of unused bandwidth, but create a tradeoff between latency and bandwidth efficiency. The smaller the blocks, the lower the latency, but efficiency also becomes lower with smaller blocks as more bandwidth is used for identification information. If the blocks are made larger, efficiency is improved, but latency increases as some data sources must be buffered and the transmission of the buffered data delayed while blocks containing data from another source are transmitted.

SUMMARY

The present disclosure describes systems and methods for multiplexing multiple data sources. Some illustrative embodiments include a method for combining multiple data sources that includes building one or more single-source data words. The single-source data words iteratively are built making a first selection of a data source from a plurality of data sources, writing data from the data source selected to each data section within a single-source data word if enough data is available to fill all sections of the single-source data word, copying a data bit of the single-source data word to a data bit within a start word associated with the single-source data word, and clearing the data bit of the single-source data word. The method also includes transmitting the one or more single-source data words after transmitting a start word identifying the beginning of a data frame, and after transmitting one or more multi-source data words within the same data frame The data written into the one or more single-source data words and data most recently written into the one or more multi-source data words that precede the one or more single-source data words originate from the first selected data source.

Other illustrative embodiments include information carrier medium comprising software that can be executed on a processor to cause the processor to build one or more single-source data words. The single-source data words are iteratively built by making a selection of a first data source from a plurality of data sources, writing data from the data source selected to each data section within a single-source data word if enough data is available to fill all sections of the single-source data word, copying a data bit of the single-source data word to a data bit within a start word associated with the single-source data word, and clearing the data bit of the single-source data word. The software further causes the processor to transmit the one or more single-source data words after transmitting a start word identifying the beginning of a data frame, and after transmitting one or more multi-source data words within the same data frame. The data written into the one or more single-source data words and data most recently written into the one or more multi-source data words that precede the one or more single-source data words originate from the first selected data source.

Yet further illustrative embodiments include a computer system comprising a plurality of buffers (each buffer of the plurality of buffers comprising data collected from the computer system), a multiplexer coupled to the plurality of buffers; and a communications interface coupled to the multiplexer. The multiplexer is configured to transmit one or more single-source data words after transmitting a start word identifying the beginning of a data frame, and after transmitting one or more multi-source data words within the same data frame. The multiplexer formats the one or more single-source data words that comprise data from at least one buffer of the plurality of buffers. The data is added to a section within a single-source data word if enough data is available to fill all sections of the single-source data word. A data bit of the single-source data word is copied to a start word associated with the single-source data word, the data bit within the single-source data word cleared after being copied. The source of the data written into the one or more single-source data words is also the source of data most recently written into the one or more multi-source data words that precede the one or more single-source data words.

Still other illustrative embodiments include a method for reconstructing one or more data streams, comprising receiving a data frame comprising a start word, at least one multi-source data word, and one or more single-source data words, the start word marking the beginning of the data frame, and the one or more single-source data words received after the at least one multi-source data word. The method also includes extracting data used to reconstruct the one or more data streams iteratively by identifying a source for data stored within a single source data word, copying a data bit associated with the single-source data word from the start word to a data bit within the single source data word, and storing the data from within the single-source data word into a buffer associated with the identified source. The source of the data within the one or more single-source data words is determined by an identifier within a multi-source data word most recently received before the single-source data word. The identifier is associated with a data section that contains data most recently written into the multi-source data word.

BRIEF DESCRIPTION OF THE DRAWINGS

For a detailed description of the illustrative embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

Additionally, the term "system" refers to a collection of two or more parts and may be used to refer to an electronic system such as a computer or communications system, or a portion of a computer or communications system. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
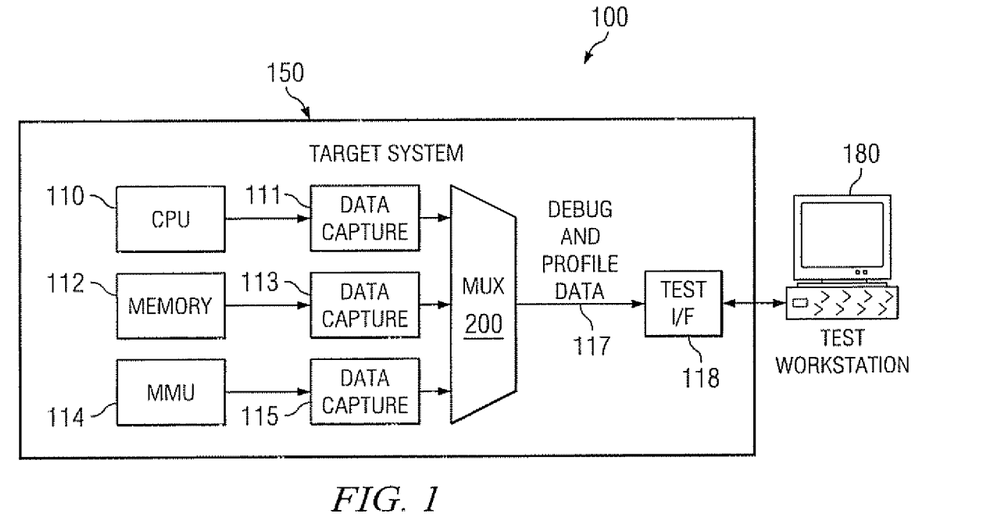
FIG. 1 shows a test and debug system that includes a target system constructed in accordance with at least some illustrative embodiments.

FIG. 1 shows a system 100 configured to debug and test a target system 150, which comprises a multiplexer (MUX) 200 constructed in accordance with at least some illustrative embodiments of the invention. Target system 150 includes a central processing unit (CPU) 110, memory 112, and a memory management unit (MMU) 114, which each couples to data capture logic blocks (Data Capture) 111, 113, and 115 respectively as shown. Each data capture logic block is configured to record and store data generated by the various elements of the target system 150, based upon pre-programmed triggers. Each data capture logic block 111, 113, and 115, is coupled to an input of multiplexer 200, and each data capture logic block is capable of providing the captured data to a user monitoring the debug and test data provided by multiplexer 200. Debug and profile data 117 is received from multiplexer 200 and forwarded to a test workstation 180 via test interface 118, which couples to both the output of multiplexer 200 and to test workstation 180. Using test workstation 180, the user can monitor the received debug and profile data. The received data allows the user to debug software executing within target system 150, and to profile the performance of the software under actual operational conditions.

Figure 2:
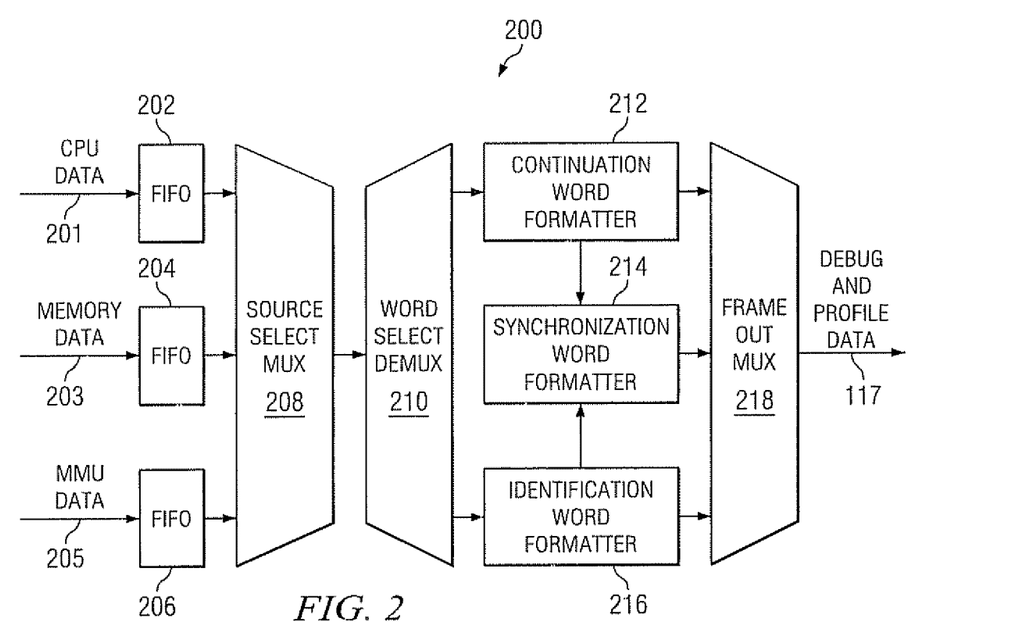
FIG. 2 shows a data multiplexer constructed in accordance with at least some illustrative embodiments.

The multiplexer 200 selects data provided by each of the data capture logic blocks. The selected data is formatted into data frames, each frame beginning with a start or synchronization word, followed by multi-source and (optionally) single-source data words that include the data received as well as information identifying the source of the data. Each frame ends with the beginning of another synchronization word. FIG. 2 shows a multiplexer 200 constructed in accordance with at least some illustrative embodiments. Incoming data from various sources (e.g., CPU data 201, memory data 203, and MMU data 205) is stored in first-in/first out buffers (FIFOs 202, 204, and 206) as the data is received. The output of each FIFO is coupled to a corresponding input of source select multiplexer (Src Sel Mux) 208. When a programmable threshold amount of data has been received by a given FIFO, indicating that the FIFO is in a ready state, the source select multiplexer 208 selects the FIFO that is ready, and the data is routed to one of two data formatters The selection of the FIFO may be event-driven (selection occurs when the FIFO is ready), or may be polling-based (selection occurs periodically using a round-robin type of algorithm).

If the data from the selected FIFO represents the first time data from a particular source is used within the current data frame, or if the data is from a source different from the source of the data most recently loaded into the latest word (if any) already included in the current data frame, word select demultiplexer (Word Sel Dmux) 210 routes data from the selected source to identification word formatter (I-Word Fmtr) 216, which is coupled to one of the outputs of source select multiplexer 208. If the data is from a source already used to provide the data most recently loaded into the latest identification word included in the current frame, the data may be routed to identification word formatter 216, or the data may alternatively be routed by demultiplexer 210 to continuation word formatter (C-Word Fmtr) 212, which also is coupled to one of the outputs of source select multiplexer 208. Both continuation word formatter 212 and identification word formatter 216 each couple to synchronization word formatter (S-Word Fmtr) 214, and each routes a bit of information associated with a continuation or identification word respectively to synchronization word formatter 214. The output of each of the three formatters is coupled to frame output multiplexer (Frm Out MuX) 218, which selects formatted data from one of the three formatters and outputs the selected formatted data words as part of the debug and profile data stream 117.

Figure 3A:
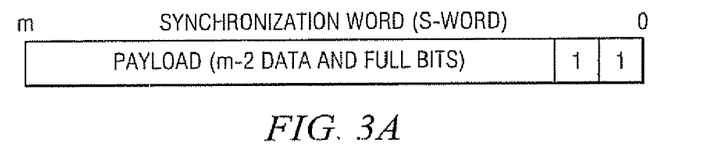
FIG. 3A shows the format of a synchronization word, in accordance with at least some illustrative embodiments.
Figure 3B:
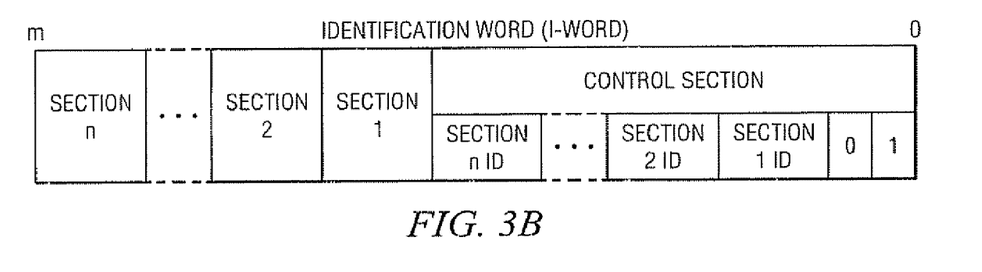
FIG. 3B shows the format of an identification word, in accordance with at least some illustrative embodiments.
Figure 3C:
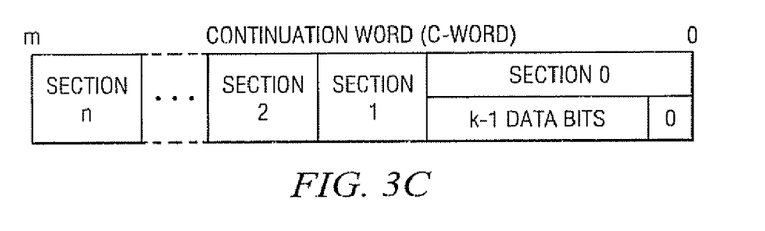
FIG. 3C shows the format of a continuation word, in accordance with at least some illustrative embodiments.

As already noted, data may be formatted into a synchronization word, an identification word, or a continuation word. FIGS. 3A through 3C show the format for each word, in accordance with at least some illustrative embodiments. The least significant bit (bit 0) of each type of word is used to distinguish continuation words (bit 0 set to zero) from synchronization and identification words (bit 0 set to one). The next, least significant bit (bit 1) is used to distinguish synchronization words (bit 1 set to one) from identification words (bit 1 set to zero). Other bit values and bit positions may also be used to identify the different types of words, and all such bit values and positions are intended to be within the scope of the present disclosure.

As already noted, a synchronization word is used to mark the beginning of a frame. FIG. 3A shows the format of a synchronization word, which contains both data and control information (as is described below) within its payload section. The synchronization word is followed by a series of identification and (optionally) continuation words that each contains data. The identification words, which can include data from multiple sources, also include information that associates the data within both the identification and continuation words with a particular data source Identification words, as shown in FIG. 3B, are divided into sections The first section, which includes the least significant bits of the identification word, is a control section The control section includes the word type bits (bits 0 and 1), and groups of bits (section ID bits) that identify the source of the data for each of the remaining sections within the identification word. Thus, section 1 ID identifies the source of the data in section 1, section 2 ID identifies the source of the data in section 2, and so on for the remaining sections, through section n, within each identification word.

The section size of the identification word determines the number of sections that can be included within an identification word, and the number of sections determines the maximum number of sources that can be identified For example, if the section size is set to eight bits (one byte), six bits of the eight are available as section ID bits (the other two bits are the word type bits). The six bits may be configured as six sections with one ID bits each (identifying one of up to two sources), as three sections with two ID bits each (identifying one of up to four sources), as two sections with three ID bite each (identifying one of up to eight sources), or as one section with six ID bits (identifying one of up to sixty-four sources). The relationship described is illustrated in table 1 below.

TABLE 1

| Max # Sources | Control Section Bit Definitions | | | | | | | |
|---|---|---|---|---|---|---|---|---|
| | Bit 7 | Bit 6 | Bit 5 | Bit 4 | Bit 3 | Bit 2 | Bit 1 | Bit 0 |
| 2 | ID 6 | ID 5 | ID 4 | ID 3 | ID 2 | ID 1 | 0 | 1 |
| 4 | ID 3 | | ID 2 | | ID 1 | | 0 | 1 |
| 8 | ID 2 | | | ID 1 | | | 0 | 1 |
| 64 | ID 1 | | | | | | 0 | 1 |

Continuing to use an eight-bit section size as an example, six section IDs result in a seven-byte (56-bit) identification word size (six data sections and one control section); 3 section IDs result in a four-byte (32-bit) identification word size; 2 sections in a three-byte (24-bit) identification word size; and one section in a two-byte (16-bit) identification word size. Other sections and ID bit sizes and combinations will become apparent to those skilled in the art, and all such sizes and combinations are intended to be within the scope of the present disclosure.

FIG. 3C shows the format of a continuation word, which is divided into sections of like size in a manner similar to the identification word. Because the continuation word lacks any identification information, the data within the continuation word is associated with a single source of data. Specifically, the continuation word is associated with the source of the data last included within the last section (section n) of the most recent preceding identification word. In at least some illustrative embodiments, the continuation word and the identification word have the same number of sections, and the sections are of equal size, resulting in a single size for both types of words (m+1 bits in the embodiments shown in FIGS. 3B and 3C). Section 0, however, is different from the other sections, as it includes the type identification bit for the continuation word (set to zero). In order to continue to use section zero as a data section, the least significant bit of the continuation word is maintained within the payload section of the synchronization word for the frame containing the continuation word. This allows the least significant bit to be cleared (identifying the word as a continuation word), while still allowing section 0 to be used to store and transmit data.

Similarly, bits within the synchronization word may be used to maintain control information related to the identification words within a frame. If there is not enough data to fill an identification word, the word is marked as "not full" by clearing a bit in the synchronization word, and all sections starting with the last section (section n) and including all adjacent sections with the same section ID as the last section are treated as not containing data. Table 2 illustrates several examples of the relationship between sections within a "not full" identification word that includes four sections, each with a 2-bit section ID field.

TABLE 2

| Section 4 ID | Section 3 ID | Section 2 ID | Section 1 ID |
|---|---|---|---|
| 00 | 00 | 00 | 00 |
| 01 | 01 | 01 | 00 |
| 10 | 10 | 01 | 01 |
| 11 | 10 | 01 | 01 |

The first row of table 2 illustrates an example of an identification word that is completely empty, since all sections have the same source identifier (00) as the last section (section 4). If the full bit corresponding to the continuation word is not set in the synchronization word, then section 4 and all adjacent sections with the same source identifier (sections 3, 2 and 1) do not contain data. The empty sections are indicated in the table by bolded text. Similarly, the second row illustrates an example of an identification word with the first three sections empty, but with data in the last section (full bit set in the synchronization word, and the same source identifier in sections 4, 3 and 2). The third and fourth rows illustrate additional examples, wherein only sections 4 and 3 are empty, and wherein only section 4 is empty.

Figure 4:
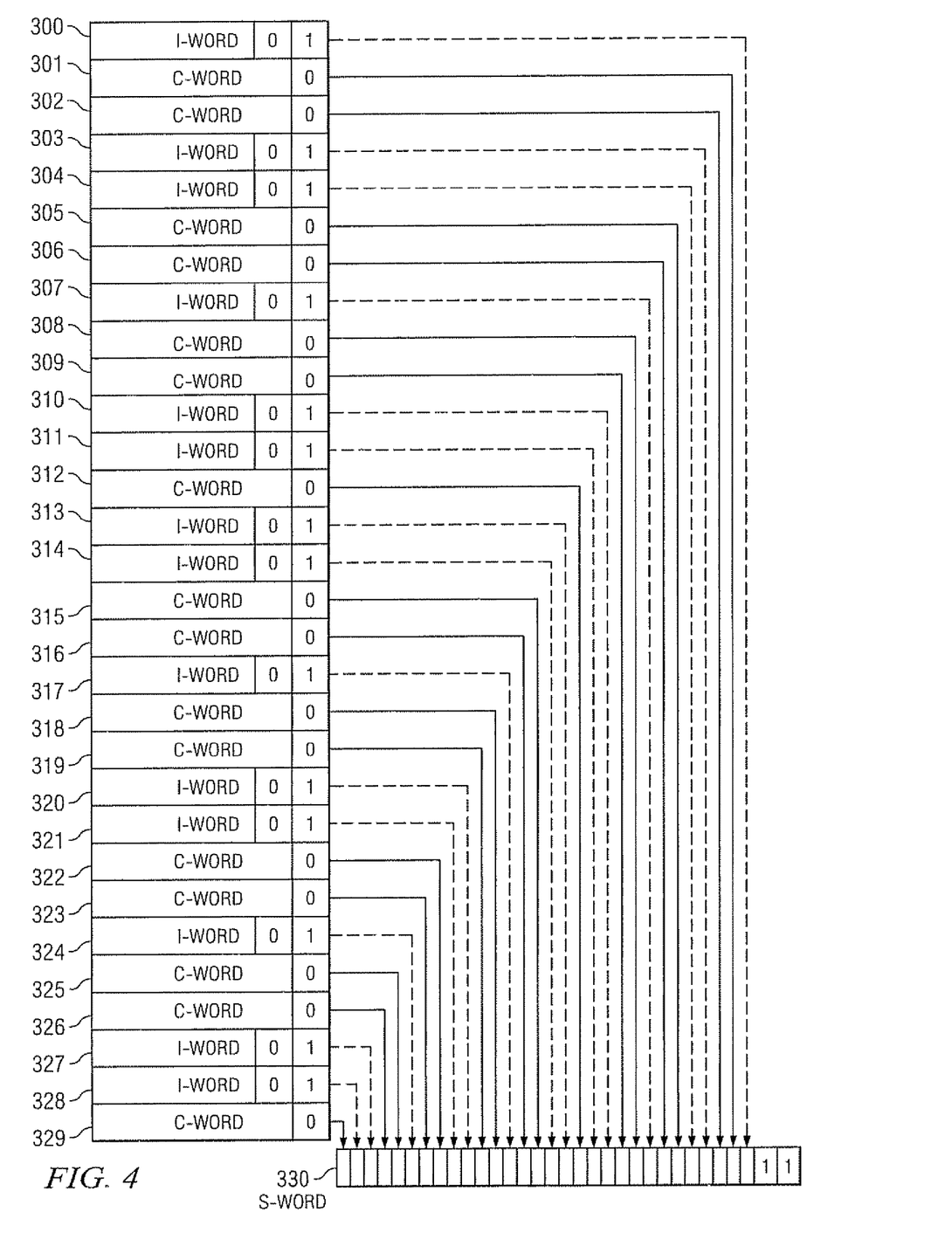
FIG. 4 shows the correlation of identification and continuation words with payload bits of a synchronization word within a fixed-length frame, in accordance with at least some illustrative embodiments.

Using the frame configuration described above, identification words and configuration words within a frame are each associated with a bit within the synchronization word. Because the synchronization word has a finite number of bits, the frame size is fixed, and includes a synchronization word plus m-2 data words made up of one or more identification words and up to m-3 continuation words (m being equal to the word size of the synchronization word). FIG. 4 illustrates an example of how the identification and continuation words within a frame are mapped to the bits of the synchronization word for a fixed-length frame where the synchronization word size is 32-bits Each of the data words (identification and continuation) map in sequence to a bit within the synchronization word, starting with the least significant bit of the payload field. Thus, identification word 300 maps to bit 2 of synchronization word 330, continuation word 301 maps to bit 3 of synchronization word 330, and each subsequent data word (identification or continuation) maps to each synchronization word bit in sequence, through continuation word 329 and bit 31 of synchronization word 330.

An alternative to using bits within the synchronization word as full-bits for identification words within the frame is to designate a source identifier value, stored in the section ID field, as an empty section indicator Thus, for example, if only three sources exist within a system, and a 2-bit section ID field is used, the sources can be assigned binary source IDs of 00, 01, and 10 respectively, and binary source ID 11 can be reserved as an empty section indicator Whenever a section contains no data, the section ID field for the empty section is set to a binary value of 11.

Yet another alternative for indicating an empty section is through the use of invalid data values or values treated by the system processing and receiving the data as a NOOP (no-operation value). If, for example, data is represented using an IEEE floating point format, a value of all bits equal to zero is not defined as a valid number. Sections within the identification word that are set to a data value with all bits set to zero are ignored as empty sections Those skilled in the art will recognize that other invalid or NOOP values may be used to indicate an empty section, and all such values are intended to be within the scope of the present disclosure.

Figure 5:
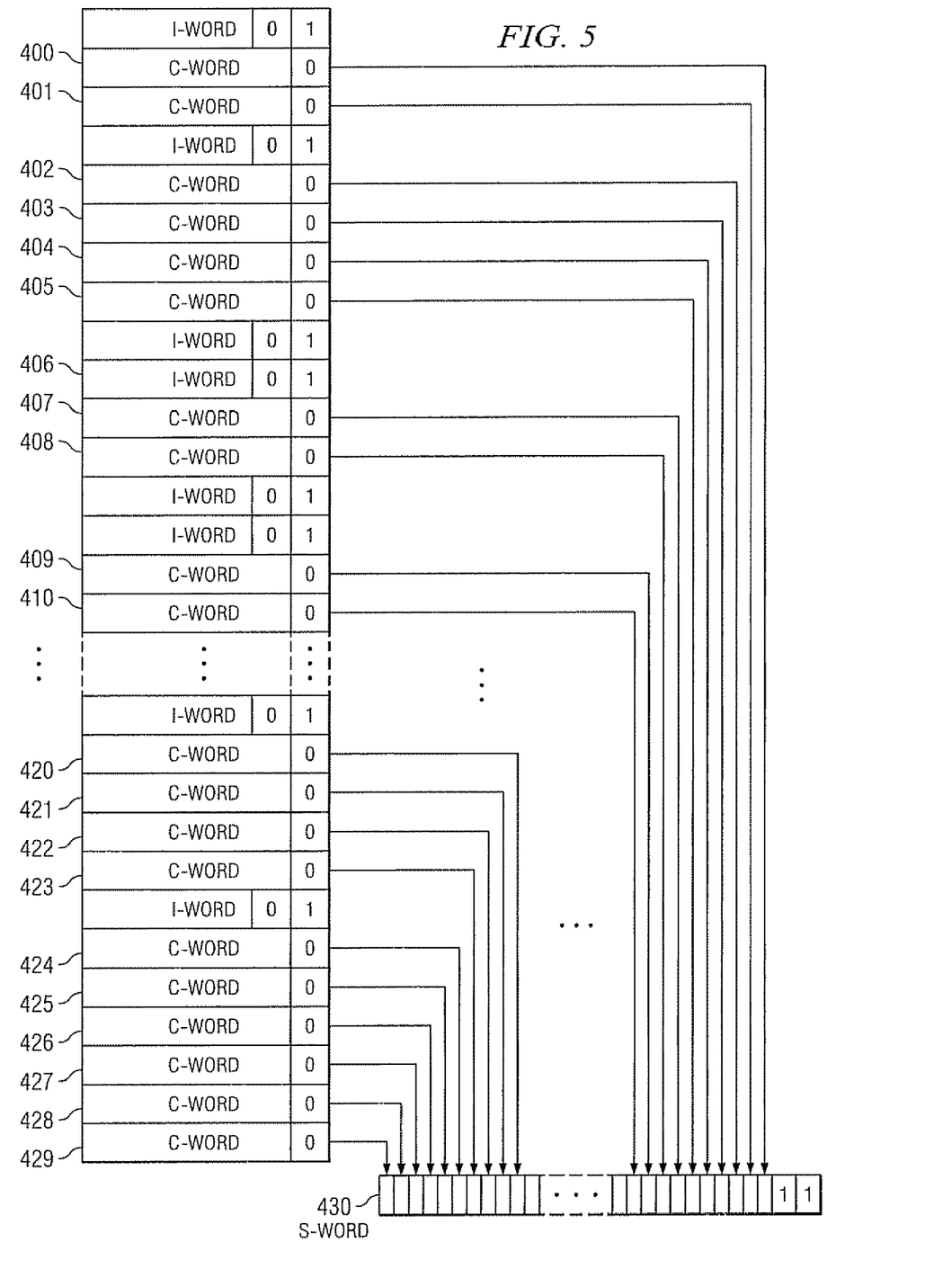
FIG. 5 shows the correlation of continuation words with payload bits of a synchronization word within a variable-length frame, in accordance with at least some illustrative embodiments.

The use of reserved source identifier values, or of illegal or NOOP data values, to indicate a non-full identification word frees up the bits in the synchronization word for use by additional continuation words (tip to m-2 bits for a synchronization word m bits in size). This also allows for any number of identification words, since the number of identification words is no longer limited by the number of bits within the synchronization words. FIG. 5 illustrates an example of such a variable-length frame. Each of the continuation words (400 through 429) maps to a corresponding bit in sequence within synchronization word 430 (bits 2 through 31), but none of the identification words map to any of the bits within synchronization word 430, since the identification words are each capable of providing an indication of when a section is empty without using a bit within the synchronization word. The frame is of variable length because the number of identification words is no longer tied to the number of bits within the synchronization word, and any number of identification words may be included within the frame.

Figure 6:
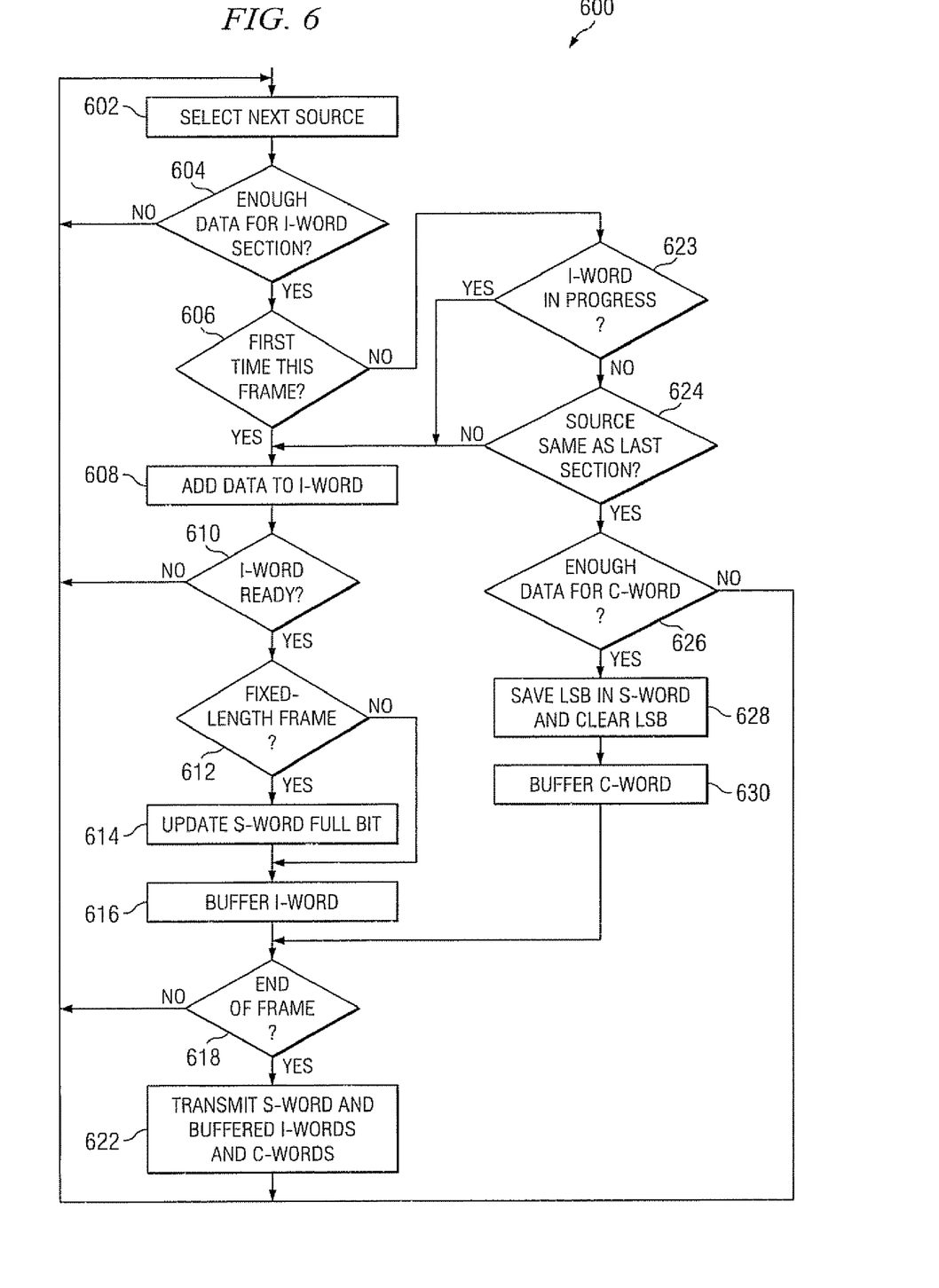
FIG. 6 shows a method for multiplexing multiple data streams, in accordance with at least some illustrative embodiments.

FIG. 6 shows a method 600 for multiplexing multiple data sources, in accordance with at least some illustrative embodiments. After a source of data has been selected (block 602) the amount of data available from that source is checked to see if it is enough to fill an identification word section (block 604). If not, the process is repeated, source by source, until one of the sources has enough data. If it is the first time the selected source has provided data for the current frame (block 606), the data is added to the current identification word (block 608). If the current identification word is not ready to be buffered as indicated in block 610 (i.e., each data section either filled or identified as empty), the process is again repeated starting at block 602.

If the current identification word is ready to be buffered (block 610) and is not part of a frame of fixed length (block 612), the current identification word is written to an output buffer (block 616). If the current identification is part of a fixed-length frame (block 612), the full bit within the synchronization word for the frame that corresponds to the current identification word is updated (block 614) to indicate empty sections within the identification, if any are present. The identification word is buffered (block 616), and if the end of the frame is not reached (block 618), the process repeats again starting at block 602. If the end of the frame is reached, the synchronization word and all buffered identification words and continuation words are transmitted (block 622), and the process repeats again starting at block 602.

Returning to block 606, if it is not the first time the selected source has provided data for the current frame, but an identification word has already been created (block 623), the data from the selected source is added to the current identification word (block 608), and processing continues as described above (blocks 610 through 622). If an identification word has not yet been created for the currently selected data (block 623), but the currently selected source of data does not match the source of the last section written to an identification word (block 624), the data from the selected source is added to the current identification word (block 608), and processing continues as described above (blocks 610 through 622).

If an identification word has not yet been created for the currently selected data (block 623), and the currently source of the data does match the source of the last section written to an identification word (block 624), data can be transmitted using a continuation word. If there is not enough data available from the selected source to fill a continuation word (block 626), the process repeats starting at block 602. If there is enough data available from the selected source to fill a continuation word (block 626) the least significant bit of the continuation word is copied to the corresponding bit within the synchronization word and cleared in the continuation word (block 628), and the continuation word is written to the Output buffer (block 630). The check for the end of frame (block 618) and the output of the frame (block 622) is performed as described above. After each frame is generated and transmitted, the process begins anew, starting at block 602.

Figure 7:
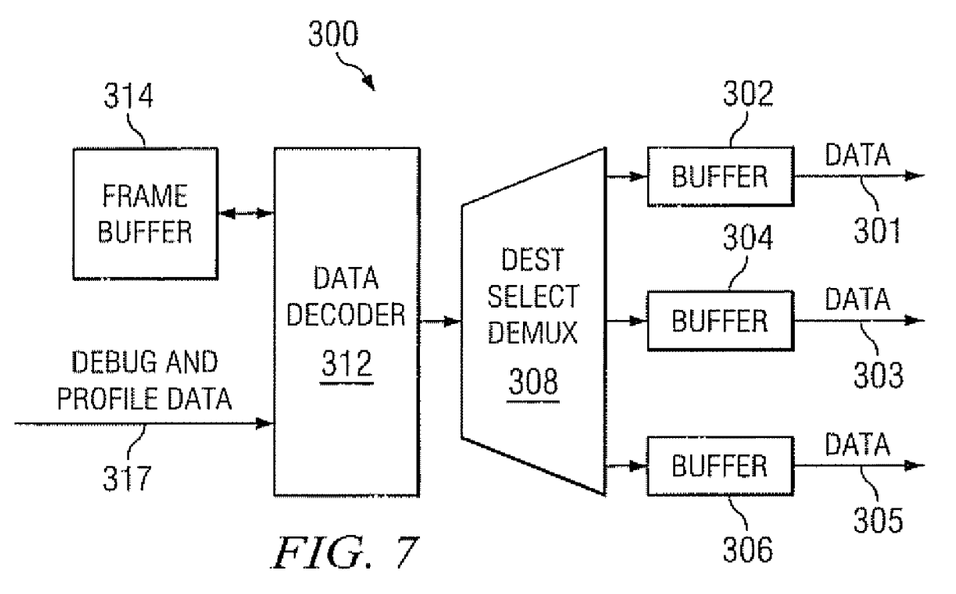
FIG. 7 shows a data demultiplexer constructed in accordance with at least some illustrative embodiments.

Although the embodiments of the present disclosure are described within the context of multiplexing data, demultiplexing data using the systems and methods described is also contemplated and intended to be within the scope of the present disclosure For example, FIG. 7 shows a demultiplexer 300, constructed in accordance with at least some illustrative embodiments. Debug and profile data 317 is received by data decoder 312, which couples to frame buffer 314 where the received data frames are stored. Identification information for each data source is extracted by data decoder 312 from identification words stored in frame buffer 314. If the system is configured to use fixed-length data frames, the full-bits in the buffered synchronization word are used to determine which identification words are full and which contain empty sections Continuation words are also processed by data decoder 312 and identified based upon the relevant identification fields within the preceding identification word. The least significant bit of the continuation words are substituted with the corresponding bit from the synchronization word as data is processed by data decoder 312. Data decoder 312 couples to destination select demultiplexer (Dest Sel Dmux) 308, and the reconstructed data extracted by data decoder 312 is routed to destination select demultiplexer 308, which selects a destination buffer based upon the extracted identification information corresponding to the extracted data transmitted by data decoder 312 to destination select demultiplexer 308. The data is routed to one of several buffers (302, 304, and 308), each coupled to an output of destination select demultiplexer 308, and the data so buffered is usable by a system monitoring the reconstructed data streams 301, 303 and 305 (e.g., test workstation 180 of FIG. 1).

The above disclosure is meant to be illustrative of the principles and various embodiments of the present invention Numerous variations and modifications will become apparent to those skilled in the art once the above disclosure is fully appreciated.

For example, although the present disclosure describes illustrative embodiments within the context of a debugging and profiling system, those skilled in the art will recognize that the data formatting and multiplexing described may be utilized in a wide variety of communications applications. Such applications may include, but are not limited to telecommunications, local and wide area networks, and closed loop control systems. It is intended that the following claims be interpreted to embrace all such variations and modifications.

What is claimed is:

1. A method for combining multiple data sources, comprising:
   building one or more single-source data words iteratively by making a first selection of a data source from a plurality of data sources; writing data from the first selected data source to each data section within a single-source data word if enough data is available to fill all sections of the single-source data word; copying a data bit of the single-source data word to a data bit within a start word associated with the single-source data word, and clearing the data bit of the single-source data word; and
   transmitting the one or more single-source data words after transmitting a start word identifying the beginning of a data frame, and after transmitting one or more multi-source data words within the same data frame;
   wherein the data written into the one or more single-source data words and data most recently written into the one or more multi-source data words that precede the one or more single-source data words originate from the first selected data source.

2. The method of claim 1, further comprising building the one or more multi-source data words by iteratively making a second selection of a data source from the plurality of data sources, and writing data from the second selected data source to a data section within a multi-source data word if enough data is available to fill the data section.

3. The method of claim 2, wherein building the one or more multi-source data words further comprises iteratively storing an identification code in a control section of the multi-source data word, the identification code indicative of the source of the data written to the data section.

4. The method of claim 3, wherein a value for the identification code is reserved as indicative of a data section within the multi-source data word that is empty.

5. The method of claim 2, wherein an invalid value for the data stored in the data section of the multi-source data word indicates that the data section is empty.

6. The method of claim 2, further comprising transmitting the one or more multi-source data words after transmitting the start word.

7. The method of claim 2, wherein each of the one or more multi-source data words is associated with a full bit within the start word, the full bit set when all sections of a corresponding multi-source data word contain data.

8. The method of claim 1, wherein data written to at least one data section of at least one multi-source data word of the one or more multi-source data words and data written to other data sections within the at least one multi-source data word originate from different data sources of the plurality of data sources.

9. The method of claim 1, wherein a same data source provides the data for all of the data sections of at least one multi-source data word of the one or more multi-source data words.

10. An Information carrier medium comprising software that can be executed on a processor to cause the processor to:
    A computer readable medium comprising computer readable instructions that when executed on a processor to cause the processor to build one or more single-source data words iteratively by making a selection of a first data source from a plurality of data sources; writing data from the first selected data source to each data section within a single-source data word if enough data is available to fill all sections of the single-source data word; and copying the least significant bit of the single-source data word to a bit within a start word associated with the single-source data word, and clearing the least significant bit of the single-source data word; and transmit the one or more single-source data words after transmitting a start word identifying the beginning of a data frame, and after transmitting one or more multi-source data words within the same data frame; wherein the data written into the one or more single-source data words and data most recently written into the one or more multi-source data words that precede the one or more single-source data words originate from the first selected data source.

11. The computer readable medium of claim 10 wherein the computer readable instructions further causes the processor to build the one or more multi-source data words by iteratively making a second selection of a data source from the plurality of data sources, and writing data from the second selected data source to a data section within a multi-source data word if enough data is available to fill the data section.

12. The computer readable medium of claim 11, wherein the software computer readable instructions cause the processor to build the one or more multi-source data words by further iteratively storing an identification code in a control section of the multi-source data word, the identification code indicative of the source of the data written to the data section.

13. The computer readable medium of claim 12, wherein a value for the identification code is reserved as indicative of a data section within the multi-source data word that is empty.

14. The computer readable medium of claim 11, wherein an invalid value for the data that is stored in the data section of a multi-source data word indicates that the data section is empty.

15. The computer readable medium of claim 11, wherein the software further causes the processor to transmit the one or more multi-source data words after transmitting the start word.

16. The computer readable medium of claim 11, wherein each of the one or more multi-source data words is associated with a full bit within the start word, the full bit set when all sections of a corresponding multi-source data word contain data.

17. The computer readable medium of claim 10, wherein data written to at least one data section of at least one multi-source data word of the one or more multi-source data words and data written to other data sections within the at least one multi-source data word originate from different data sources of the plurality of data sources.

18. The information carrier medium of claim 10, wherein a same data source provides the data for all of the data sections of at least one multi-source data word of the one or more multi-source data words.

19. A computer system, comprising:
   a plurality of buffers, each buffer of the plurality of buffers comprising data collected from the computer system;
   a multiplexer coupled to the plurality of buffers; and
   a communications interface coupled to the multiplexer and configured to transmit one or more single-source data words after transmitting a start word identifying the beginning of a data frame, and after transmitting one or more multi-source data words within the same data frame;
   wherein the multiplexer formats the one or more single-source data words that comprise data from at least one buffer of the plurality of buffers, the data added to a section within a single-source data word if enough data is available to fill all sections of the single-source data word and a data bit of the single-source data word copied to a start word associated with the single-source data word, the data bit within the single-source data word cleared after being copied; and wherein the source of the data written into the one or more single-source data words is also the source of data most recently written into the one or more multi-source data words that precede the one or more single-source data words.

20. The computer system of claim 19, wherein the multiplexer further formats the one or more multi-source data words that comprise additional data from one or more of the data buffers.

21. The computer system of claim 20, wherein the one or more multi-source data words further comprises an identification code in a control section of the multi-source data word, the identification code indicative of the source of the data written to the data section.

22. The computer system of claim 21, wherein a value for the identification code is reserved as indicative of a data section within the multi-source data word that is empty.

23. The computer system of claim 20, wherein an invalid value for the data stored in the data section of the multi-source data word indicates that the data section is empty.

24. The computer system of claim 20, wherein the multiplexer further transmits the one or more multi-source data words after transmitting the start word.

25. The computer system of claim 20, wherein each of the one or more multi-source data words is associated with a full bit within the start word, the full bit set when all sections of a corresponding multi-source data word contain data.

26. The computer system of claim 19, wherein data written to at least one data section of at least one multi-source data word of the one or more multi-source data words and data written to other data sections within the at least one multi-source data word originate from different data sources of the plurality of data sources.

27. The computer system of claim 19, wherein a same data source provides the data for all of the data sections of at least one multi-source data word of the one or more multi-source data words.

28. A method for reconstructing one or more data streams, comprising:

receiving a data frame comprising a start word, at least one multi-source data word, and one or more single-source data words, the start word marking the beginning of the data frame, and the one or more single-source data words received after the at least one multi-source data word; and extracting data used to reconstruct the one or more data streams iteratively by identifying a source for data stored within a single source data word, copying a data bit associated with the single-source data word from the start word to a data bit within the single source data word, and storing the data from within the single-source data word into a buffer associated with the identified source;

wherein the source of the data within the one or more single-source data words is determined by an identifier within a multi-source data word most recently received before the single-source data word; and wherein the identifier is associated with a data section that contains data most recently written into the multi-source data word.

* * * * *